United States Patent [19]
Payne

[11] Patent Number: 5,029,790
[45] Date of Patent: Jul. 9, 1991

[54] ADJUSTABLE BRACKET

[75] Inventor: Geoffrey C. Payne, Solihull, United Kingdom

[73] Assignee: Jaguar Cars Limited, United Kingdom

[21] Appl. No.: 524,217

[22] Filed: May 15, 1990

[30] Foreign Application Priority Data

May 23, 1989 [GB] United Kingdom ............. 8911779

[51] Int. Cl.$^5$ .................................... F16B 1/00
[52] U.S. Cl. ............................ 248/274; 248/287; 403/388
[58] Field of Search ............. 248/544, 200, 274, 285, 248/287, 298; 411/539; 403/388, 108, 408.1, 107

[56] References Cited

U.S. PATENT DOCUMENTS

| 1,370,453 | 3/1921 | Kilgour | 248/298 |
| 2,733,786 | 2/1956 | Drake | 403/388 |
| 2,986,627 | 5/1961 | Marriett | 248/298 |
| 3,213,978 | 10/1965 | Downes | 403/108 |
| 4,035,093 | 7/1977 | Redshaw | 403/388 |
| 4,140,294 | 2/1979 | Zwarts | 248/287 |
| 4,235,560 | 11/1980 | Schimmel | 403/388 |

FOREIGN PATENT DOCUMENTS

| 623756 | 8/1961 | Italy | 403/408.1 |
| 14782 | 9/1901 | Sweden | 403/388 |
| 257227 | 10/1970 | U.S.S.R. | 403/408.1 |
| 1164476 | 6/1985 | U.S.S.R. | 403/408.1 |

Primary Examiner—Ramon O. Ramirez
Assistant Examiner—Robert A. Olson
Attorney, Agent, or Firm—Davis, Bujold & Streck

[57] ABSTRACT

An adjustable bracket incorporates a base member to be secured to a secondary member. The base member has an aperture formed in it and a plate member is mounted adjacent to the base member so as to be slidable relative thereto, the plate member engaging with the base member so as to be slidable relative thereto, the plate member engaging with the base member in the direction of sliding so as to restrict rotation of the plate member relative to the base member. The plate member has an elongate slot which is inclined relative to the direction of sliding and is co-operable with the aperture in the base member so as to define therewith a window of variable position. A fastening element passes through the window for securing the base member to the secondary member.

8 Claims, 2 Drawing Sheets

ADJUSTABLE BRACKET

FIELD OF THE INVENTION

The present invention relates to an adjustable bracket.

BACKGROUND OF THE INVENTION

It is often desired to secure two elements together, but such an operation can be difficult where there are constraints on the relative positioning of the elements, such as being secured to a further element. In such circumstances it is necessary to introduce a tolerance in the relative positioning of the elements, but this in itself can introduce further difficulties. For example, the tolerance may permit relative movement between the two elements or may require special fasteners.

OBJECT OF THE INVENTION

It is an object of the present invention to provide an adjustable bracket which permits a tolerance in the positioning of the elements to be fastened, but which does not introduce further difficulties.

SUMMARY OF THE INVENTION According to the present invention there is provided an adjustable bracket incorporating a base member to be secured to a secondary member, the bracket comprising:

a base member having an aperture formed therein;

a plate member mounted adjacent to the base member so as to be slidable relative thereto, the plate member engaging with the base member in the direction of sliding so as to restrict rotation of the plate member relative to the base member, the plate member having an elongate slot formed therein, which slot is inclined relative to the direction of sliding and is co-operable with the aperture formed in the base member so as to define therewith a window of variable position; and a fastening element passing through the window for securing the base member to the secondary member.

Preferably the slot is inclined to the direction of sliding at an angle of substantially 20°.

The base member may be provided with a plurality of apertures and the plate member may be provided with a corresponding number of slots.

The plate member may engage with a protrusion formed on the base member. The protrusion may be in the form of a protruding edge provided on the base member.

Alternatively or additionally, the plate member may be provided with a protrusion which engages with the base member. The protrusion on the plate member may be in the form of a protruding edge. The protrusion on the plate member may engage with a channel formed in the base member.

For a better understanding of the present invention and to show more clearly how it may be carried into effect reference will now be made, by way of example, to the accompanying drawings in which:

DESCRIPTION OF PREFERRED EMBODIMENTS

Figure 1:
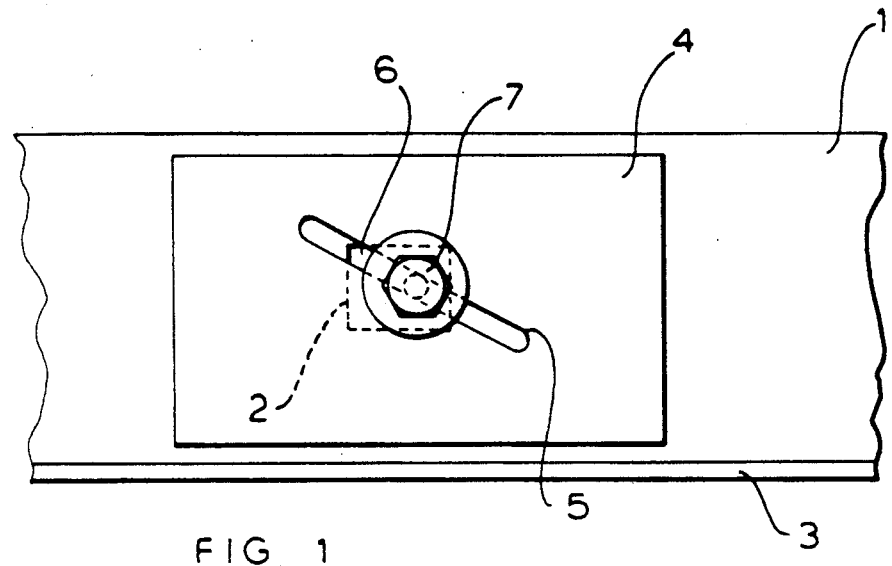
FIG. 1 is a plan view of one embodiment of an adjustable bracket according to the present invention.
Figure 2:
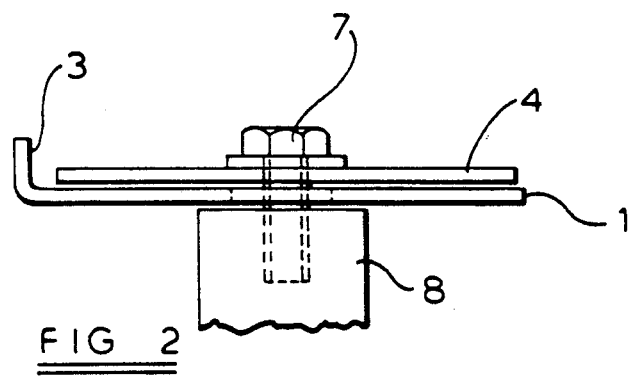
FIG. 2 is an elevational view of the adjustable bracket shown in FIG. 1.

FIGS. 1 and 2 show an adjustable bracket which comprises a fixed base member 1 having an aperture 2 formed therein. The aperture 2 is shown as being square, but this is not necessarily the case and the aperture may be circular or may have any other convenient configuration. The dimensions of the aperture 2 are such that it allows the full required adjustment of the bracket. The base member 1 is also formed with protruding or upstanding edge 3 (as shown in FIGS. 1 and 2), the purpose of which will be explained in more detail hereinafter.

Mounted adjacent to the base member 1 is a slotted plate 4. Slotted plate 4 abuts along one edge thereof against the upstanding edge 3 of the base member 1 and is slidable relative thereto. Slotted plate 4 is provided with an elongate slot 5 inclined relative to the edge of the slotted plate which abuts against the upstanding edge. The angle of inclination may be varied within wide limits. Preferably, the angle of inclination should be as small as possible, and we have found that an angle of about 20° is satisfactory. It will be appreciated that sliding the slotted plate 4 relative to the base member 1 causes the slot 5 to move relative to the aperture 2 resulting in a window 6 of varying position and dimensions depending on the relative position of the plate 4 and the member 1.

A fastening element 7 such as a metal screw is passed through the window 6 into a secondary member 8 which is to be secured to the adjustable bracket. The fastening element 7 is then tightened to eliminate relative movement between the base member 1 and the secondary member 8.

Due to the dimensions and the inclination of the elongate slot 5 in the plate 4 it is possible to ensure effective securement of the secondary member 8 to the adjustable bracket irrespective of the position of the secondary member 8 and the fastening element 7 relative to the aperture 2. This eliminates problems of alignment which might otherwise arise.

Figure 3:
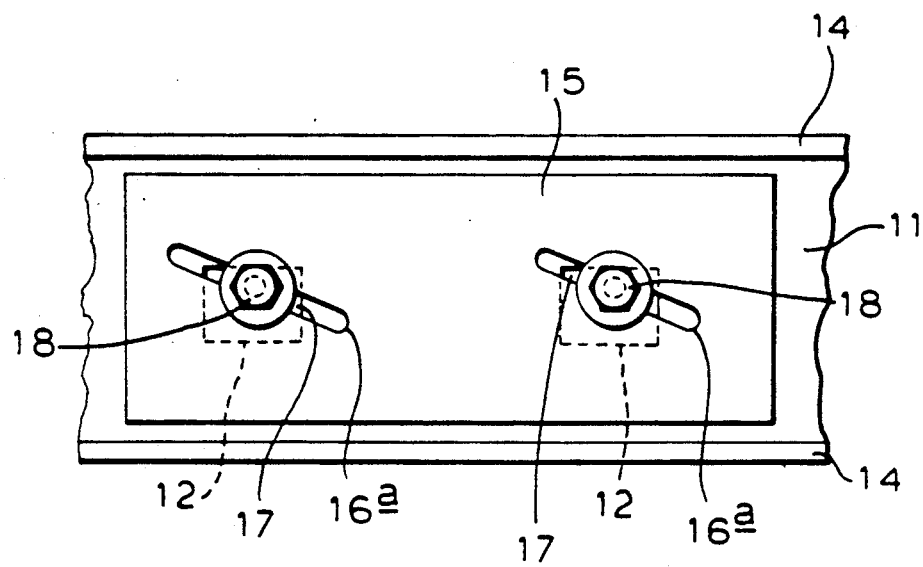
FIG. 3 is a plan view of another embodiment of an adjustable bracket according to the present invention.
Figure 4:
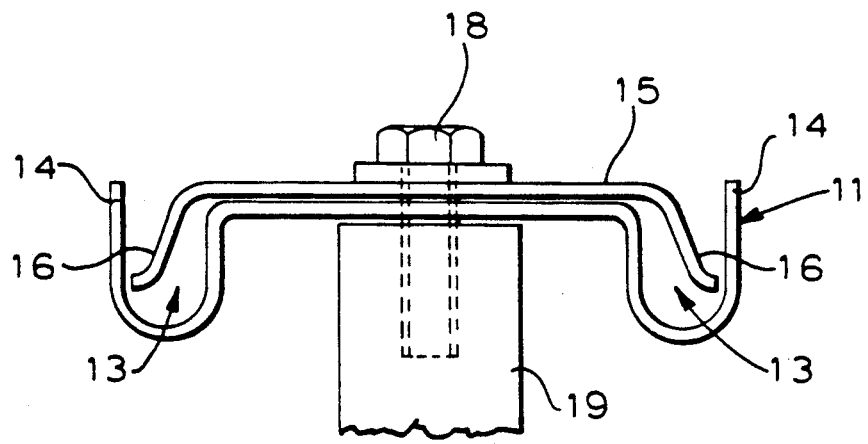
FIG. 4 is an elevational view of the adjustable bracket shown in Figure 3.

Further advantages of the invention are realised in the embodiment shown in FIGS. 3 and 4. The adjustable bracket shown in FIGS. 3 and 4 comprises a fixed base member 11 having two apertures 12 formed therein. The apertures 12 are shown as being square, but this is not essential and the apertures may be circular or may have any other convenient configuration. The dimensions of the apertures 12 are such that they allow the full required adjustment of the bracket. The base member 11 is formed with two channels 13 which give rise to upstanding edges 14 (as shown in FIGS. 3 and 4).

Mounted adjacent to the base member 11 is a slotted plate 15 which is provided with protruding or downturned edges 16 (as shown in FIGS. 3 and 4) which engage in the channels 13 in the base member 11. This permits sliding movement of the slotted plate 15 relative to the base member 11. Slotted plate 15 is also provided with two elongate slots 16a inclined relative to the edge of the plate. The angle of inclination may be varied within wide limits, but we have found that an angle of about 20° is satisfactory. As with the embodiment of FIGS. 1 and 2, it will be appreciated that sliding the plate 15 relative to the base number 1 causes the slots 16 to move relative to the apertures 12 resulting in windows 17 of varying position and dimensions depending on the relative position of the plate 15 and the member 11. It is essential, of course, to ensure that the relative spacing between the apertures 12 and between the slots 16 is such that the dimensions of the two windows are substantially identical.

A fastening element 18 such as a metal screw is passed through each of the windows 17 into a secondary member 19 which is to be secured to the adjustable bracket. The fastening elements are then tightened to eliminate relative movement between the base member 11 and the secondary member 19 during tightening and afterwards.

In addition to the advantages of the embodiment described with reference to FIGS. 1 and 2, because there are two windows and two fastening elements the tendency of the secondary member 19 to twist relative to the base member 11 is substantially reduced compared with other methods of securing the two elements together with a degree of tolerance in their relative positions. A further advantage can be realised if the embodiment of FIGS. 3 and 4 is used in an inverted position compared with that shown in the figures and the lengths of at least one of the edges 14,16 are greater than the length of the fastening element 18. This enables the plate 15 to be engaged with the base member 11 prior to inserting the fastening element 18.

In one particular application of the adjustable bracket according to the present invention, the bracket is used to support and align a two-piece propeller shaft of an automobile at its center bearing position. The present adjustable bracket permits this to be accomplished without inducing a twist on the center bearing which could otherwise result in undesired noise, vibration and harshness in the vehicle transmission.

Clearly, the number of slots in the slotted plate is not limited to two and more slots could be used if desired. Moreover, it is not necessary to support the slotted plate along opposite edges and support along a single edge will suffice.

I claim:

1. An adjustable bracket comprising:
   a first base member and a second base member, the first base member having an aperture formed therein;
   a plate member mounted adjacent to the base members so as to be slidable relative thereto, the plate member having an elongate slot formed therein;
   a fastening element passing through the slot in the plate member and through the aperture in the first base member and engaging with the second base member at a predetermined position relative to said second base member so as to secure together the plate member, the first base member and the second base member; and
   guide means provided between at least one of the base members and the plate member for guiding the sliding of the plate member in a linear direction relative to the base members and for inhibiting rotation of the plate member relative to the base members, wherein
   the elongate slot in the plate member is dimensioned relative too the fastening member such that the fastening member is freely movable in the longitudinal direction of the slot, and the aperture in the first base member is dimensioned relative to the fastening member such that the fastening member is freely movable in lateral directions within the aperture, the slot being formed so as to be inclined relative to said linear direction such that, as the plate member is moved in a sliding manner relative to the base members in sad linear direction, the elongate slot is co-operable with the aperture in the first base member so as to define therewith a window permitting the fastening element to be positioned therethrough at a variable distance from said engaging means so as to enable the fastening element to engage with the second base member at said predetermined position.

2. An adjustable bracket according to claim 1, wherein the slot is inclined to the direction of sliding at an angle of substantially 20°.

3. An adjustable bracket according to claim 1, wherein the base member is provided with a plurality of apertures and the plate member is provided with a corresponding number of slots.

4. An adjustable bracket according to claim 1 wherein the plate member engages with a protrusion provided on the base member.

5. An adjustable bracket according to claim 4, wherein the protrusion is in the form of a protruding edge provided on the base member.

6. An adjustable bracket according to claim 1, wherein the plate member is provided with a protrusion which engages with the base member.

7. An adjustable bracket according to claim 6, wherein the protrusion on the plate member is in the form of a protruding edge.

8. An adjustable bracket according to claim 6, wherein the protrusion on the plate member engages with a channel formed in the base member.

* * * * *